United States Patent [19]

Dedolph

[11] 4,439,552

[45] Mar. 27, 1984

[54] METHOD OF PREPARING A URETHANE PREPOLYMER AND POLYMER

[75] Inventor: Richard R. Dedolph, Naperville, Ill.

[73] Assignee: Gravi-Mechanics Co., Chicago, Ill.

[21] Appl. No.: 350,946

[22] Filed: Feb. 22, 1982

Related U.S. Application Data

[63] Continuation of Ser. No. 262,204, May 8, 1981, Pat. No. 4,329,436.

[51] Int. Cl.$^3$ ............................................. C08G 18/14
[52] U.S. Cl. .................................... 521/159; 521/905; 528/76; 528/80; 528/83; 528/903; 528/904
[58] Field of Search .................. 521/159, 905; 528/76, 528/80, 83, 903, 904

[56] References Cited

U.S. PATENT DOCUMENTS

| | | | |
|---|---|---|---|
| 3,373,009 | 3/1968 | Pruitt et al. ............................. | 71/28 |
| 3,479,325 | 11/1969 | Blomeyer et al. .................... | 528/69 |
| 3,723,393 | 3/1973 | Kistner ................................. | 528/61 |
| 3,805,531 | 4/1974 | Kistner ................................. | 405/264 |
| 3,805,532 | 4/1974 | Kistner ................................. | 405/264 |
| 3,812,619 | 5/1974 | Wood et al. ........................... | 47/58 |
| 3,814,736 | 6/1974 | Gibier-Rambaud et al. ......... | 528/48 |
| 4,127,515 | 11/1978 | MacRae et al. ...................... | 521/905 |
| 4,241,537 | 12/1980 | Wood .................................... | 47/77 |

OTHER PUBLICATIONS

Chemical Engineering Progress, vol. 57, No. 10, Oct. 1961, pp. 48–51.

Primary Examiner—Maurice J. Welsh
Attorney, Agent, or Firm—Wood, Dalton, Phillips, Mason & Rowe

[57] ABSTRACT

A method of forming a hydrophilic urethane prepolymer comprising the steps of reacting an isocyanate compound to a hydrophilic polyether or polyester compound which has been heated to such a temperature that the temperature of the reactants after addition of isocyanate is at least as high as about 120° C. The resulting urethane prepolymer may be reacted with water to form a cellular urethane polymer.

4 Claims, 5 Drawing Figures

METHOD OF PREPARING A URETHANE PREPOLYMER AND POLYMER

CROSS REFERENCE TO RELATED APPLICATION

This is a continuation of copending application Ser. No. 262,204, filed May 8, 1981, now U.S. Pat. No. 4,329,436, issued May 11, 1982.

BACKGROUND OF THE INVENTION

1. Field of the Invention

This invention relates generally to the field of urethane prepolymer formation and, more specifically, this invention relates to a method of forming a urethane prepolymer which exhibits improved capacity for binding aggregate material such as peat and for forming high quality foams.

2. Description of the Prior Art

The use of various polymeric materials to provide support for aggregate material, such as the use of polymeric foam to form a matrix for plant growth-supporting nutrients, for example, is well known.

One form of polymeric matrix which has found wide acceptance in the soil consolidation art is polyurethane form which comprises a polyether or polyester urethane formed by the process conventionally known as the "one-shot" process, or from a liquid urethane prepolymer which is reacted with an aqueous slurry of aggregate material.

In one form of the slurry reaction referred to above, a hydrophilic liquid urethane prepolymer which comprises an isocyanate-capped polyol with an excess of free isocyanate groups is reacted with a slurry comprising aggregate material, water, and any of various modifying agents such as blowing agents, promoters, accelerators, or other modifying ingredients.

The following U.S. patents, the disclosures of which are hereby incorporated by reference, provide examples of prior approaches to aggregate material consolidation with a urethane foam matrix.

Pruitt et al. U.S. Pat. No. 3,373,009 discloses a method of forming a nutrient plant growth medium from a urethane made by reacting a polyether or polyester compound and a diisocyanate at a temperature below 120° C. for a period of between about 2 and 4 hours. The prepolymer is then mixed with an aqueous mixture of catalyst, plant nutrient, and selected modifying ingredients to produce a foam polyurethane polymer intimately incorporating the plant nutrients.

Kistner U.S. Pat. Nos. 3,805,531 and 3,805,532 describe a reaction scheme wherein a urethane prepolymer is formed by mixing a compound having a plurality of active hydrogen atoms, such as polyol, with a stoichiometric excess of an organic polyisocyanate or polyisothiocyanate compound at ambient temperature under essentially anhydrous conditions for a period of several days.

Wood et al. U.S. Pat. Nos. 3,812,619 and 4,241,537 describe a similar reaction conducted at a temperature below 120° C. for a period of about 6 hours.

All known prior methods of forming a urethane prepolymer ultimately used to produce a plant growth medium involve a maximum reaction temperature of 120° C., and generally require rather lengthy reaction and/or aging (curing) periods. This maximum temperature limitation has been thought necessary due to the strongly exothermic nature of the isocyanate-polyol capping reaction, and the common belief that undesirable spurious side reactions, such as homopolymerization of isocyanate, are encountered to an unacceptable degree at elevated temperatures above 120° C. The presumed existence of these side reactions even at temperatures below 120° C. has in the past resulted in the use of relatively pure reagents.

SUMMARY OF THE INVENTION

It is an object of the present invention to overcome one or more of the problems described above.

In accordance with the invention, a hydrophilic liquid urethane prepolymer useful in the consolidation of aggregate material is formed by conducting an exothermic condensation reaction between a hydrophilic polyether or polyester compound and a stoichiometric excess of an isocyanate compound under controlled conditions at an elevated temperature above about 120° C.

More specifically, the present invention contemplates a reaction between a hydrophilic polyether or polyester compound, preferably a polyol such as polyethylene glycol, under substantially anhydrous conditions wherein the polyol is heated to a temperature above about 120° C., followed by addition of an isocyanate compound without added mixing to initiate an exothermic condensation (capping) reaction between the polyol and isocyanate compound. The initial polyol temperature should be sufficiently high that the average temperature of the reactants after addition of the isocyanate compound is greater than about 120° C.

It is to be understood that reference herein to the preferred polyol is not limiting, but is intended to apply to polyether or polyester reactants generally.

The reaction proceeds relatively rapidly and the rate of reaction is directly related to the initial polyol temperature. The rate of reaction may be controlled by control of the surface area of the interface between the resulting relatively dense isocyanate compound layer and the overlying polyol layer. Control of the interface surface area may be effected by selection of an appropriately-shaped reaction vessel.

The reaction may be quenched if necessary by the addition of an excess of polyol. Subsequent addition of isocyanate compound permits the reaction to proceed after quenching and cooling. The reaction does not require reagent grade reactants.

The resulting liquid prepolymer is suitable for reaction with an aqueous slurry of aggregate material in order to form a polymeric matrix supporting the aggregate material. It has been found that the binding ability of the prepolymer is superior to the binding ability of urethane prepolymers made according to the prior methods.

Prepolymers made according to the invention require no aging or curing prior to reaction thereof with an aqueous aggregate slurry.

Further objects and advantages of the invention will be apparent to those skilled in the art from the following detailed description taken in conjunction with the drawings and the appended claims.

DETAILED DESCRIPTION OF THE PREFERRED EMBODIMENT

Figure 1:
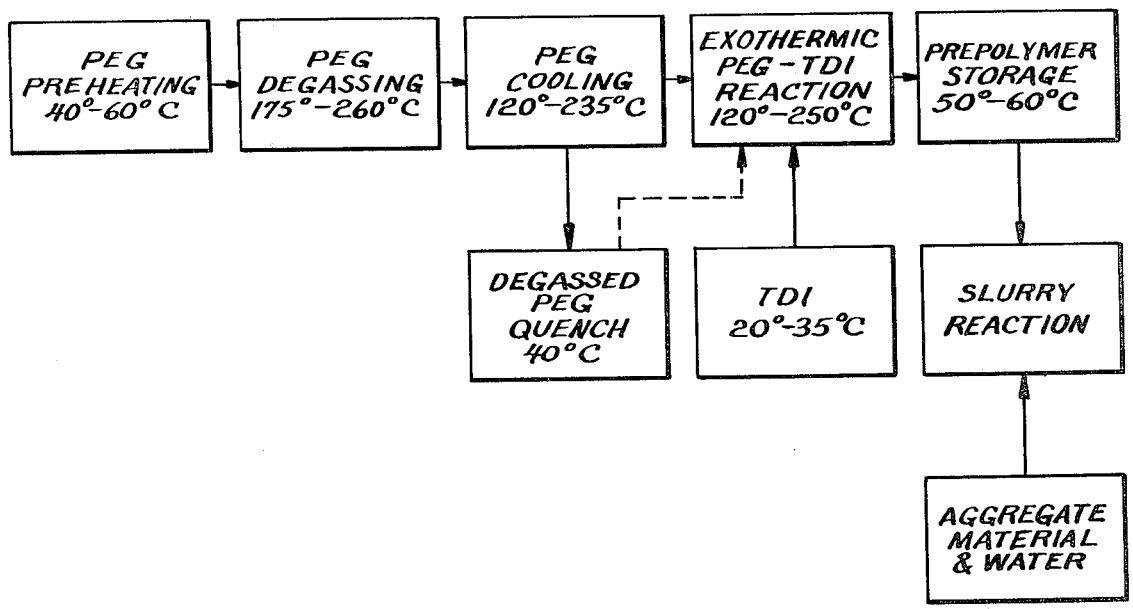
FIG. 1 is a flow diagram illustrating the steps of a preferred embodiment of the method of this invention.

The present invention contemplates the formation of a hydrophilic liquid urethane prepolymer by a high-temperature, exothermic condensation reaction between a hydrophilic polyether or polyester compound and a stoichiometric excess of an organic polyisocyanate or polyisocyanate compound (referred to herein as "isocyanate compound") under substantially anhydrous conditions. The reaction is initiated by addition, preferably without added mechanical mixing, of the isocyanate compound to a quantity of the water-free polyether or polyester compound which has been heated to a temperature of at least about 120° C.

The isocyanate compound is more dense than the polyether or polyester compound and thus forms a layer underlying a polyether/polyester layer. The rate of reaction may be controlled by control of the surface area of the interface between the respective isocyanate and polyether/polyester layers, as by use of an appropriately-shaped reaction vessel.

The reaction is strongly exothermic, and is autocatalyzed at temperatures above about 120° C. When relatively cool isocyanate is added to the hot polyether/polyester, the reaction temperature will initially generally drop or remain constant, and subsequently rise fairly rapidly due to the reaction exotherm. If desired, added mixing may be used to accelerate initiation of the reaction, but should not be used thereafter until after the reaction temperature has peaked and has begun to fall, and the reaction is known to be controllable.

A preferred means of accelerating the initiation of the reaction is recirculation of the isocyanate compound through the polyether/polyester layer, as described below.

The rate of reaction can be controlled by (1) the use of relatively small volumes of reactants, and (2) periodic quenching when the reaction temperature exceeds a predetermined maximum value by addition of anhydrous polyether or polyester, and subsequent addition of isocyanate to reinitiate the reaction after the reaction temperature has fallen to an acceptable level.

The prepolymer obtained by the reaction may be reacted immediately with an aqueous slurry of unconsolidated aggregate material. Aging of the prepolymer is not required.

PREPOLYMER FORMATION

Polyether-Polyester Reactant

Any of a variety of polyether or polyester precursors useful in making polyurethane prepolymers may be used according to this invention. Suitable polyethers or polyesters include polyalkylene or polyoxyalkylene glycols or diols, including polybutylene glycol, polyethylene glycol (PEG), polypropylene glycol, polyoxyethylene glycerol, mixed polypropylene-polyethylene glycols, diethyleneglycol-adipic acid polyesters and caprolactone polyesters. Specific examples of suitable precursors include the poly-(oxyethylene-oxypropylene) polyols sold by BASF-Wyandotte under the trademark "Pluronic," or those sold by Union Carbide Co. under the trademark "NIAX," and hydrophilic polyols with heteric oxyethylene-oxypropylene chains.

Preferred polyols are those hydrophilic or water-soluble ethylene- or oxyethylene-containing polyols having molecular weights between about 1000 and 3000, although polyols having molecular weights below or above this range may be used if desired.

A highly preferred polyol is a polyethylene glycol (PEG) having a molecular weight of about 1000 and marketed by Union Carbide Co. under the trademark "Carbowax 1000."

Isocyanate Compound

Polyisocyanates which can be used to prepare isocyanate-capped prepolymers according to this invention include aliphatic and aromatic polyisocyanates and polyisothiocyanates containing at least two active isocyanate groups per molecule. Aromatic polyisocyanates are preferred because prepolymers made therefrom generally react relatively rapidly with water to form foam polymer.

A preferred polyisocyanate compound is tolylene diisocyanate (TDI). A preferred form of TDI is a blend sold by Olin Co. under the trade designation "TDI-80" and comprising about 80 wt.% tolylene-2,4-diisocyanate and 20 wt.% tolylene-2,6-diisocyanate, although other blends of the 2,4 and 2,6 isomers are useful.

Reaction Conditions

The flow diagram of FIG. 1 illustrates the steps involved in the formation of urethane prepolymer, and the use of the prepolymer to form a consolidated aggregate material, in a preferred embodiment of the invention.

Polyols such as the preferred "Carbowax 1000" brand PEG are relatively viscous liquids. Therefore, the polyol should be moderately heated (e.g. 40°–60° C.) during storage and prior to initiation of the reaction.

Since the reaction should be performed under substantially anhydrous conditions and since polyols used in the reaction are highly hydrophilic, it is generally preferred to "degas" (drive off any accumulated water) the polyol prior to initiation of the reaction. Degassing may be accomplished by heating the polyol to a temperature between about 175° C. and 260° C. for a period of between about 15–20 minutes. Although the polyol may be degassed at temperatures below 175° C., higher temperatures are preferred in order to accomplish the degassing in a convenient period of time. It should be noted, however, that exposure of PEG to temperatures above 175° C. for a sustained period of time results in darkening of the PEG, presumably through carburization. Such darkening does not have an adverse effect on the method of the invention.

According to the invention, the polyol-isocyanate reaction is initiated while the polyol is at a temperature at or above about 120° C. A practical upper limit of the initial polyol temperature is about 235° C. Therefore, it may be necessary to cool degassed polyol if relatively high degassing temperatures are used.

Isocyanate may be stored at ambient temperatures, i.e. between about 20° C.–35° C. After introduction of a desired amount of polyol to a reaction vessel, a stoichiometric excess of isocyanate is carefully introduced to the vessel.

Isocyanate should be introduced to the reaction vessel with a minimum of added mechanical mixing. Since isocyanate is generally more dense than polyol, isocyanate may be introduced to the bottom of the reaction vessel in order to minimize mixing. Alternatively, isocyanate may be metered through the polyol layer, or isocyanate may be introduced to the vessel prior to introduction of polyol.

The polyol temperature just prior to isocyanate addition should be sufficiently high that the initial reaction temperature is greater than about 120° C.

It may be necessary to provide some mixing immediately after isocyanate addition in order to initiate the reaction. One means of effectively increasing the area of the reactive interface is to circulate isocyanate from the bottom of the reactor to the polyol surface, preferably along the sides of the reactor. Thus, a relatively sluggish initial reaction may be accelerated in a highly controllable manner. After the reaction is initiated, the exothermicity of the reaction will be detected in the form of a rise of the reaction temperature. Recirculation of isocyanate through the polyol should be terminated before the reactants reach a predetermined temperature or the rate of reaction will be excessive.

The polyol-isocyanate reaction evolves isocyanate-containing gas. By adding isocyanate without mechanical mixing (except for reaction initiation) until the reaction is known to be under control, the amount of evolved isocyanate gas lost to the atmosphere is reduced, since any evolved gas must pass through the polyol layer, resulting in reaction of a substantial portion isocyanate in the evolved gas with polyol.

Alternatively, the reaction may be conducted by the addition of small amounts of isocyanate to polyol with continuous mixing, but a relatively large proportion of isocyanate may be lost to the atmosphere since the effective size of the polyol layer is reduced.

Addition of relatively cool isocyanate to hot polyol generally results in an initial drop of the reaction temperature. However, after the reaction is initiated, the reaction temperature rises sharply, peaks and falls after the exothermicity of the reaction is exhausted. This phenomenon is illustrated in FIGS. 2–5 and detailed in the Example, below.

Temperatures within the reaction vessel should be continuously monitored, and maintained below a predetermined maximum value, as by quenching. For example, the boiling point of tolylene diisocyanate (TDI) is 251° C.; TDI temperatures should not be permitted to exceed about 235° C.

As the reaction proceeds, the effective polyol concentration decreases. Therefore, after a peak and initial drop in temperature, mechanical stirring will elicit no substantial additional exotherm, but added stirring may be employed in order to conclude the prepolymer formation reaction.

Reaction Vessel

The reaction between isocyanate and polyol occurs at the interface between the respective layers. The reaction is strongly exothermic, and the rate of reaction increases with increasing temperature. Therefore, it may, depending on initial reaction temperature, be advantageous to control the size of the interface between the layers, and thus the rate of reaction, by selection of a reaction vessel of appropriate shape. Furthermore, the reaction vessel should not be overly large, as the absolute amount of heat produced by the reaction increases with the mass of the reactant.

It is advantageous to use a reaction vessel having a selected, relatively narrow cross-section at its lower end, which accommodates a predetermined maximum amount of isocyanate. Thus, the size of the interface between the overlying polyol layer and the more dense isocyanate layer is controlled.

Should the reaction temperature rise to a predetermined maximum, rapid quenching of the reaction is readily effected by addition of cool, degassed polyol. The additional polyol rapidly reacts with free isocyanate groups in the reaction mixture. After the reaction mixture has cooled to a safe level, isocyanate may be introduced to reinitiate the polyol-isocyanate reaction.

Consolidation of Aggregate Material

The urethane prepolymer formed as described above may be reacted with water in an aqueous slurry of various types of aggregate material to form a foam polymer matrix which supports the aggregate material.

One especially advantageous aggregate material is peat. Other forms of organic residue or soil which may be consolidated along with nutrient materials to support plant growth include, but are not limited to, sewage sludge, compost, and clays.

Figure 3:
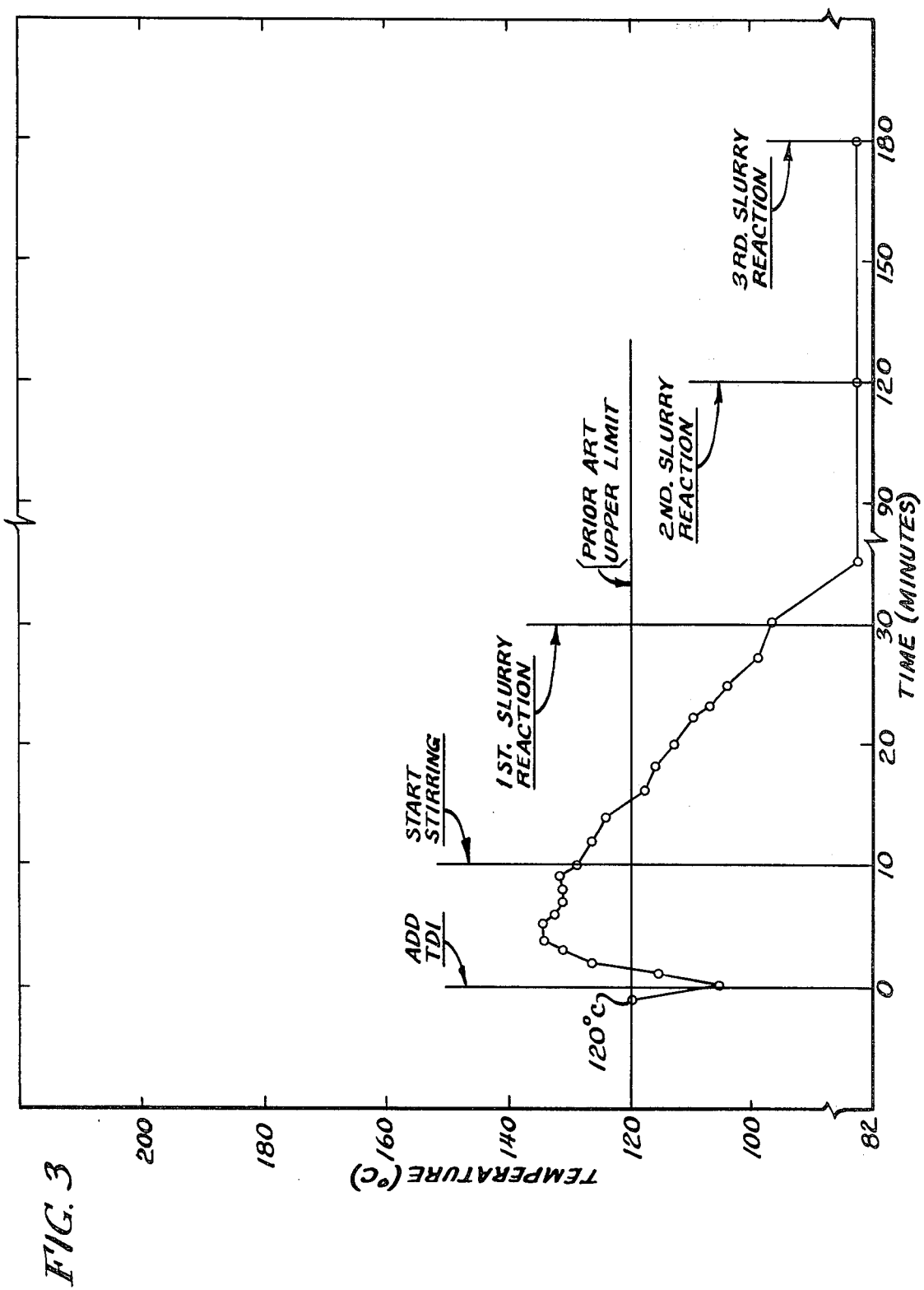
FIG. 3 is a plot of reaction temperature vs. time for prepolymer formation according to the invention with an initial polyol temperature of about 120° C.
Figure 4:
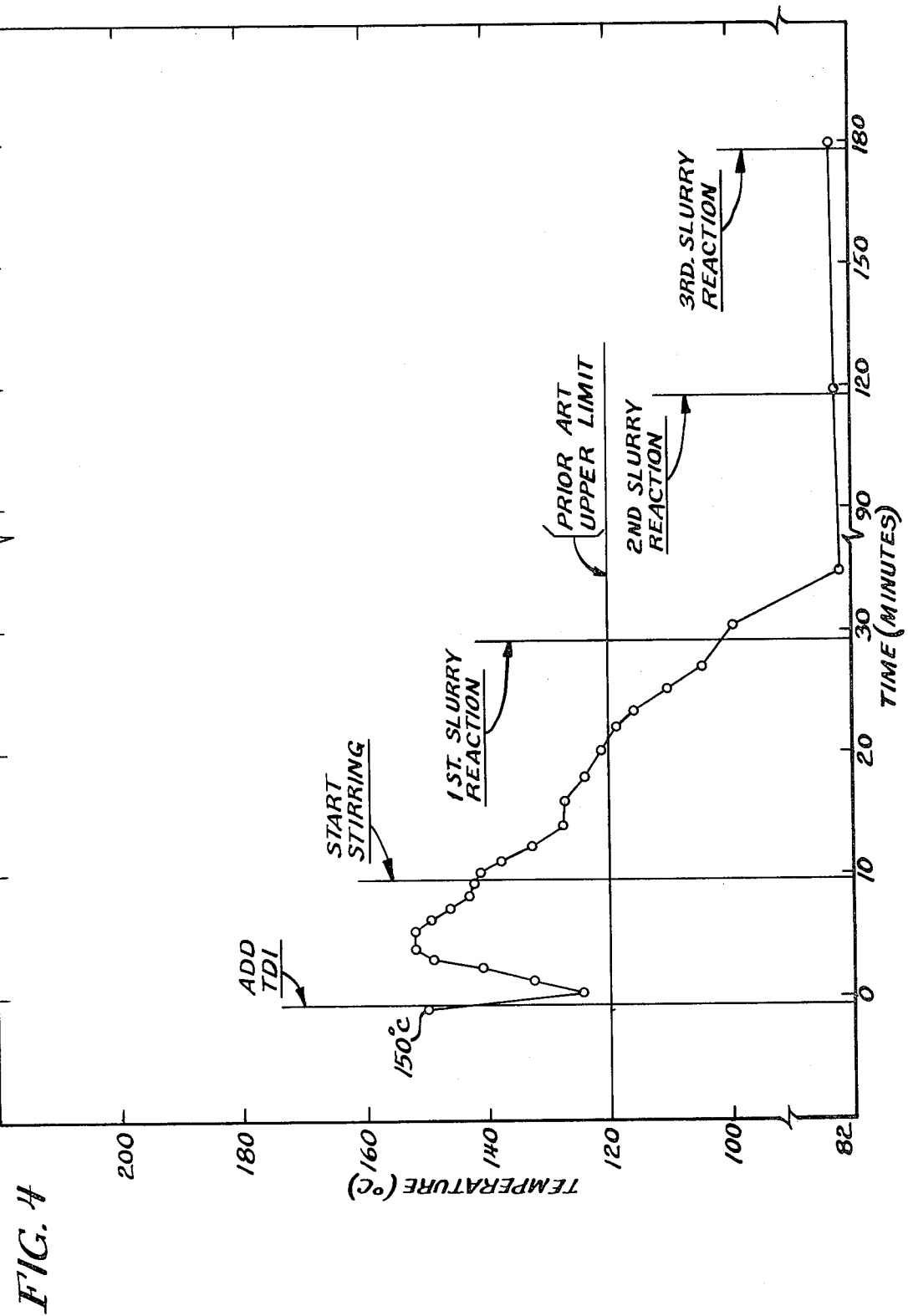
FIG. 4 is a plot of reaction temperature vs. time for prepolymer formation according to the invention with an initial polyol temperature of about 150° C.; and, FIG. 5 is a plot of reaction temperature vs. time for prepolymer formation according to the invention with an initial polyol temperature of about 180° C.
Figure 5:
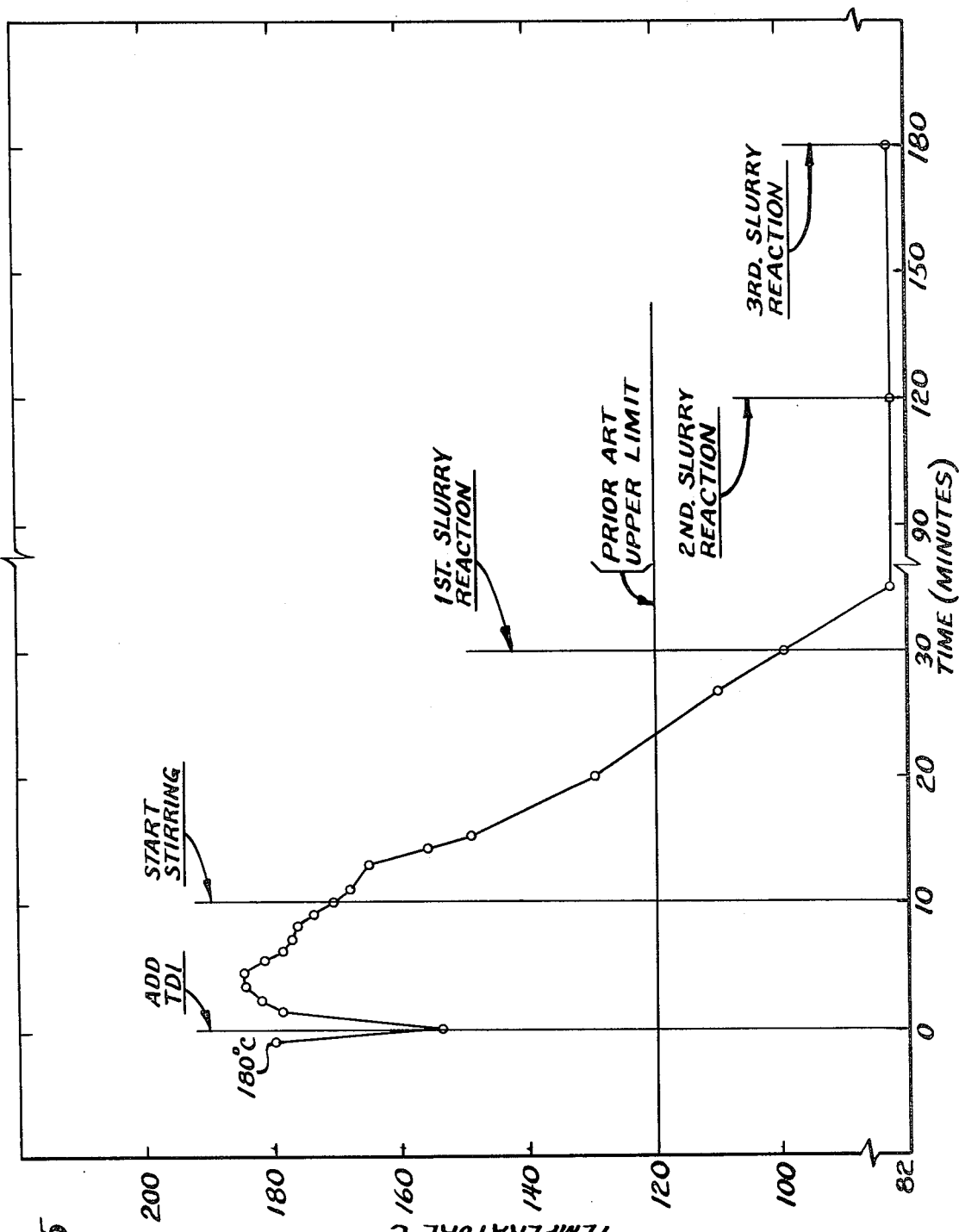

As indicated in FIGS. 3, 4 and 5, the urethane prepolymers formed in the Example, below, can be reacted with a peat-water slurry 30 minutes, 2 hours or 3 hours after initiation of the polyol-isocyanate reaction to produce quick curing, strong soil plugs. The time lapse required depends on the time of reaction. Soil plugs made from the prepolymer of the invention are more thoroughly bound than soil plugs made with prepolymer produced at lower reaction temperatures and thus lesser amounts of prepolymer may be used to produce plugs of like strength.

The following Example will illustrate production of a urethane prepolymer according to a preferred embodiment of the invention.

EXAMPLE

About 500 g of "Carbowax 1000" brand PEG was heated to about 177° C. and held at this temperature with stirring in order to drive off any accumulated water. After 10–15 minutes of degassing, the PEG was allowed to cool to about 120° C. 180 g TDI was carefully added to the PEG, and the temperature of the reaction system was closely monitored for the next 45 minutes. A plot of the reaction temperature vs. time is shown in FIG. 3.

The data of FIG. 3 indicate that the bulk of the reaction took place within 15 minutes of initiation, and that the entire reaction could be safely performed at a temperature above the prior art limit of 120° C.

The reaction of the foregoing Example was repeated with PEG at initial temperatures of about 150° C. and about 180° C. A plot of reaction temperature vs. time for each of these reactions is shown in FIGS. 4 and 5, respectively. The reactions all displayed the same general temperature change pattern following introduction of TDI.

Figure 2:
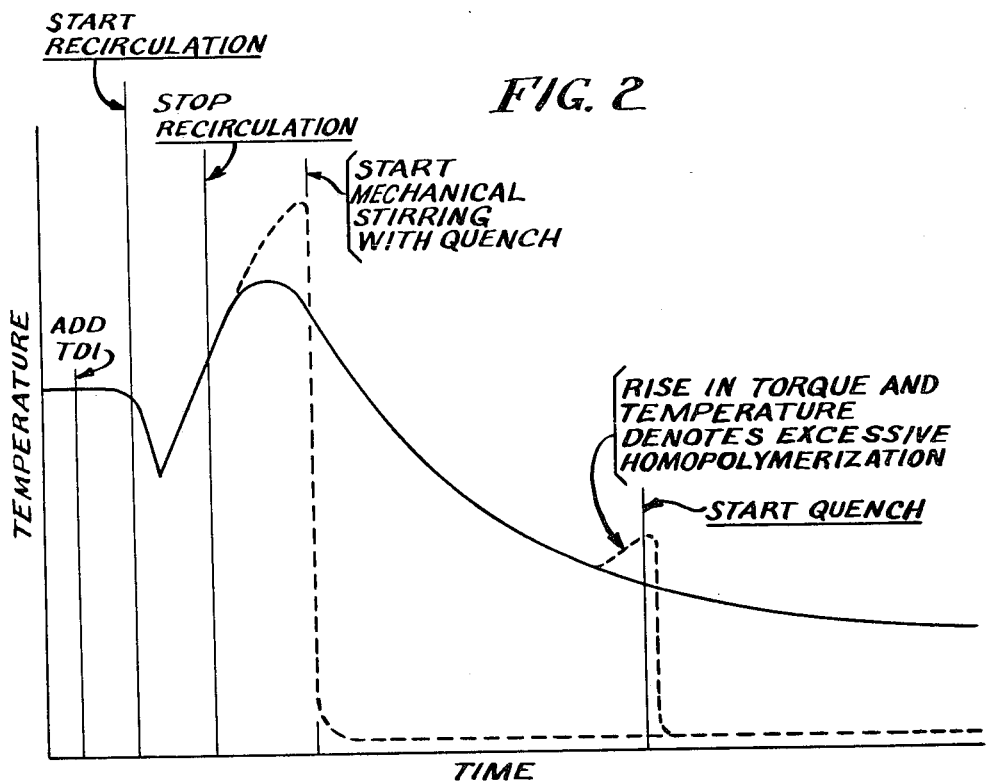
FIG. 2 is a generalized plot of reaction temperature vs. time illustrating the possible temperature effects of various events occurring during a reaction conducted according to the invention.

FIG. 2 illustrates a generalized temperature v. time plot showing the effects of recirculation of isocyanate in polyol, and the effect of mechanical stirring once the reaction has been initiated. Furthermore, the presence of an excessive side reaction (isocyanate homopolymerization) is indicated by a dotted line, with the beneficial effect of quenching also shown.

It was also found that prepolymers made at higher temperatures had a higher viscosity at any given temperature than prepolymers made at relatively low temperatures.

It has been found that the rate of heat evolution in a polyol-isocyanate reaction according to the invention increases with initial polyol temperature indicating that the nature of the reaction occurring at higher initial reaction temperatures is different from that at lower temperatures.

It will be apparent from the foregoing that higher initial reaction temperature in the polyol-isocyanate reaction, when coupled with careful monitoring and control of the reaction as disclosed herein substantially decreases the cost of prepolymer production by limiting reaction time and increasing reactor throughput. Further, the prepolymers made according to the invention have different physical characteristics from those made according to the prior art. The prepolymers will react with soil slurries or with water alone to produce open-celled, water-permeable hydrophilic elastomeric matrices having substantially different and advantageous characteristics than those produced by the prior art.

The foregoing detailed description is given for clearness of understanding only, and no unnecessary limitations should be understood therefrom, as modifications within the scope of the invention will be obvious to those skilled in the art.

I claim:

1. A method of forming a hydrophilic urethane prepolymer, said method comprising the steps of:
   (a) adding to a polyether or polyester compound under substantially anhydrous conditions a stoichiometric excess of compound containing at least two active isocyanate groups per molecule to form a reaction mixture and initiate an exothermic condensation reaction between said polyether or polyester compound and said isocyanate compound, the temperature of said reactants being such that the temperature of said reaction mixture after addition of isocyanate is greater than about 120° C.;
   (b) allowing said reaction to proceed in order to form a hydrophilic urethane prepolymer;
   (c) observing the temperature of said reaction mixture as said reaction proceeds; and
   (d) adding to said reaction mixture additional anhydrous polyether or polyester compound when said reaction mixture temperature exceeds a predetermined maximum value, whereby said reaction is quenched.

2. A method of forming a hydrophilic urethane prepolymer, said method comprising the steps of:
   (a) adding to a polyether or polyester compound under substantially anhydrous conditions a stoichiometric excess of a compound containing at least two active isocyanate groups per molecule to form a reaction mixture and initiate an exothermic condensation reaction between said polyether or polyester compound and said isocyanate compound, the temperature of said reactants being such that the temperature of said reaction mixture after addition of isocyanate is greater than about 120° C.;
   (b) allowing said reaction to proceed in order to form a hydrophilic urethane prepolymer;
   (c) observing the temperature of said reaction mixture;
   (d) adding to said reaction mixture additional anhydrous polyether or polyester compound when said reaction mixture temperature exceeds a predetermined maximum value, whereby said reaction is quenched;
   (e) allowing said reaction mixture temperature to fall below said predetermined maximum value after quenching; and
   (f) adding to said reaction mixture a quantity of said isocyanate compound sufficient to re-initiate said reaction.

3. A method of forming a cellular urethane polymer, said method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of said reactants after addition of isocyanate is greater than about 120° C.;
   (b) allowing said reaction to proceed in order to form a hydrophilic urethane prepolymer; and
   (c) reacting said prepolymer with water to form said cellular urethane polymer.

4. A cellular urethane polymer prepared by the method comprising the steps of:
   (a) adding to a polyether or polyester compound under substantially anhydrous conditions a stoichiometric excess of a compound containing at least two active isocyanate groups per molecule to initiate an exothermic condensation reaction between said polyether or polyester compound and said isocyanate compound, the temperature of said reactants being such that the temperature of the reactants after addition of isocyanate is greater than about 120° C.;
   (b) allowing said reaction to proceed in order to form a hydrophilic urethane prepolymer; and
   (c) reacting said prepolymer with water to form said cellular urethane polymer.

* * * * *